United States Patent
Zhang et al.

(10) Patent No.: US 12,519,178 B1
(45) Date of Patent: Jan. 6, 2026

(54) ADVANCED PRESSURE EQUILIBRIUM DEVICE (PED) AND PRESSURE RELIEF VALVE (PRV)

(71) Applicant: Ford Global Technologies, LLC, Dearborn, MI (US)

(72) Inventors: Xiaogang Zhang, Novi, MI (US); Sam Tomlinson, Farmington Hills, MI (US); Parikshit Gupte, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/817,903

(22) Filed: Aug. 28, 2024

(51) Int. Cl.
| | |
|---|---|
| *F16K 17/06* | (2006.01) |
| *F16K 17/04* | (2006.01) |
| *F16K 49/00* | (2006.01) |
| *H01M 50/333* | (2021.01) |

(52) U.S. Cl.
CPC ....... *H01M 50/333* (2021.01); *F16K 17/0413* (2013.01); *F16K 17/06* (2013.01); *F16K 49/00* (2013.01)

(58) Field of Classification Search
CPC ...... F16K 17/0413; F16K 17/06; F16K 49/00; H01M 50/333
See application file for complete search history.

(56) References Cited

U.S. PATENT DOCUMENTS

| | | | | |
|---|---|---|---|---|
| 4,311,166 A | * | 1/1982 | De Feo | F16K 49/00 |
| | | | | 251/305 |
| 2003/0066511 A1 | * | 4/2003 | Heulitt | F16K 15/063 |
| | | | | 123/73 V |
| 2023/0420791 A1 | | 12/2023 | Yadav | |
| 2024/0047815 A1 | | 2/2024 | Rink et al. | |

FOREIGN PATENT DOCUMENTS

| | | |
|---|---|---|
| CN | 109904367 A | 6/2019 |
| CN | 111490212 A | 8/2020 |
| CN | 212028659 U | 11/2020 |
| CN | 212209631 U | 12/2020 |
| CN | 215568239 U | 1/2022 |
| CN | 218677473 U | 3/2023 |
| CN | 116428396 A | 7/2023 |
| JP | 2022549053 A | 11/2022 |
| KR | 20230021760 A | 2/2023 |
| WO | 2023237234 A1 | 12/2023 |

\* cited by examiner

*Primary Examiner* — P. Macade Nichols
(74) *Attorney, Agent, or Firm* — David Kelley; McCoy Russell LLP

(57) ABSTRACT

A dual pressure relief valve (PRV)/pressure equilibrium device (PED) assembly is provided as a more efficient and less expensive alternative to separate, conventional PRV and PED devices. By combining the PRV and the PED into a single device, a number of parts may be reduced, thereby reducing a manufacturing resources of the PRV and PED devices. The disclosed PRV/PED includes a disc valve positioned at an end of a Venturi tube through which vent gas is expelled, where a membrane surrounds the Venturi tube. Pressurized vent gas exiting the enclosure under the (Continued)

thermal runaway conditions causes the disc valve to open, protecting the membrane. Additionally, due to an increase in speed of the vent gas as it passes a neck of the Venturi tube, cool air is drawn into the vent gas via the membrane, decreasing a temperature of the vent gas as it is expelled.

20 Claims, 10 Drawing Sheets

ADVANCED PRESSURE EQUILIBRIUM DEVICE (PED) AND PRESSURE RELIEF VALVE (PRV)

FIELD

The present description relates generally to thermal management of a battery pack of an electric vehicle.

BACKGROUND/SUMMARY

A typical battery pack of an electric vehicle (EV) may include a pressure relief valve (PRV) to seal the battery pack under normal conditions, and to expel vent-gas during thermal runaway conditions. The battery pack may also include a pressure equilibrium device (PED), which may balance pressures inside and outside the battery pack and keep moisture from entering the battery pack under normal conditions. A conventional PED typically includes a specially designed spring that is very sensitive to temperature. Under the thermal runaway conditions, the spring may expand as the temperature inside the battery pack increases. As the spring expands, a piston coupled to the spring is pushed, closing the PED. Closing the PED under thermal runaway conditions may prevent a degradation of a membrane of the battery pack that protects high-voltage electrical components of the battery pack. If the membrane degrades, the high-voltage electrical components may be degraded by excessive heat.

The inventors herein have identified issues with the conventional PED design, which due to the spring and other moving components may be resource intensive to manufacture. A more robust PED with fewer moving parts may significantly reduce a manufacturing expense of the PED, and increase an efficiency and performance of the PED.

In one example, the issues may be at least partially addressed by a PRV/PED assembly, comprising a valve section and a Venturi section, the Venturi section including a Venturi tube having a first plurality of inner holes arranged at a middle, neck portion of the Venturi tube; an annulus membrane coupled to the Venturi tube, the annulus membrane positioned circumferentially around the middle, neck portion; and a membrane protection tube positioned circumferentially around the annulus membrane, the membrane protection tube having a second plurality of outer holes. In other words, the PRV valve includes a Venturi section, and the PED is simplified to two components, where the PRV and the PED may be manufactured together via a simplified assembly method. By combining the PRV and the PED in a single valve assembly, an amount of resources in manufacturing the PRV and the PED may be reduced. Further, the addition of the Venturi tube and the simplified component design may increase an efficiency of the PRV/PED assembly at reducing the temperature of the battery pack in thermal runaway conditions, with respect to conventional PRV/PED valves.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 1-9 are shown to scale, although other relative dimensions may be used, if desired.

DETAILED DESCRIPTION

Figure 1:
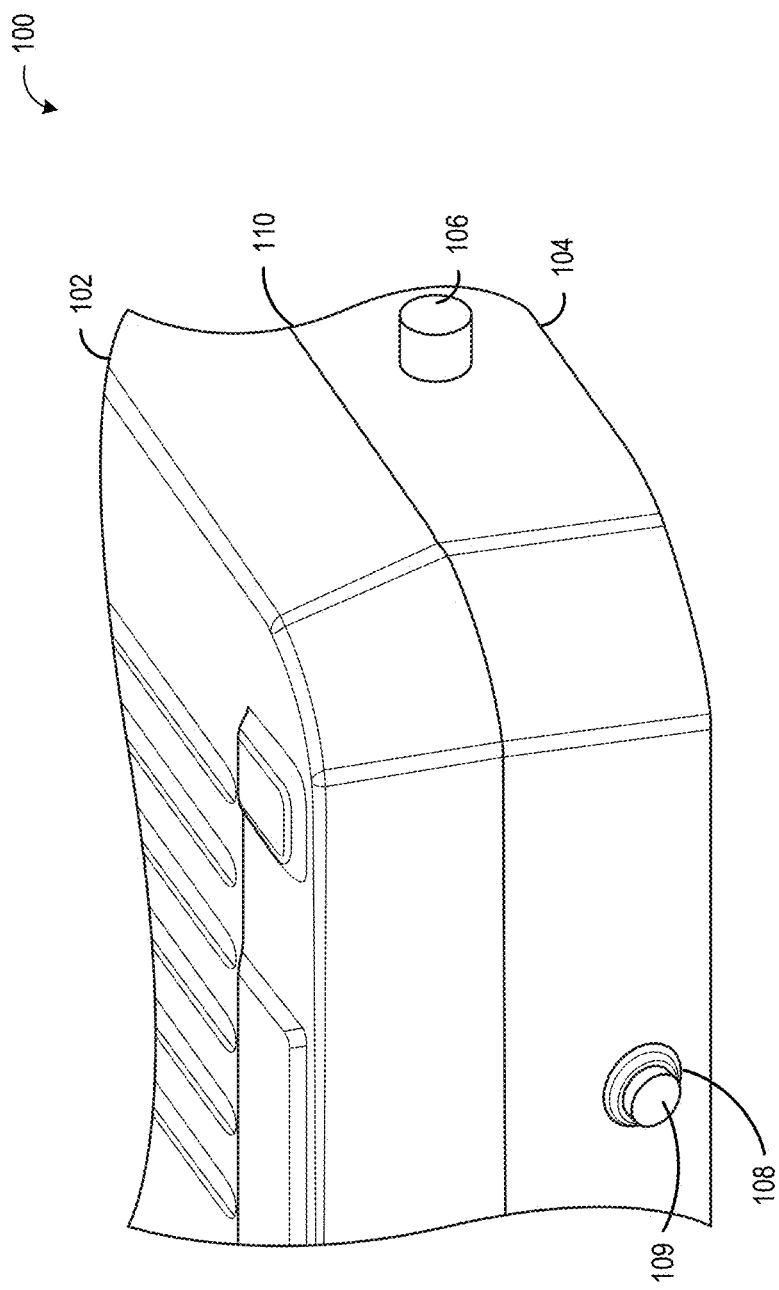
FIG. 1 is a perspective view of a portion of a typical battery pack of an EV including a PRV and a PED, as prior art.
Figure 2:
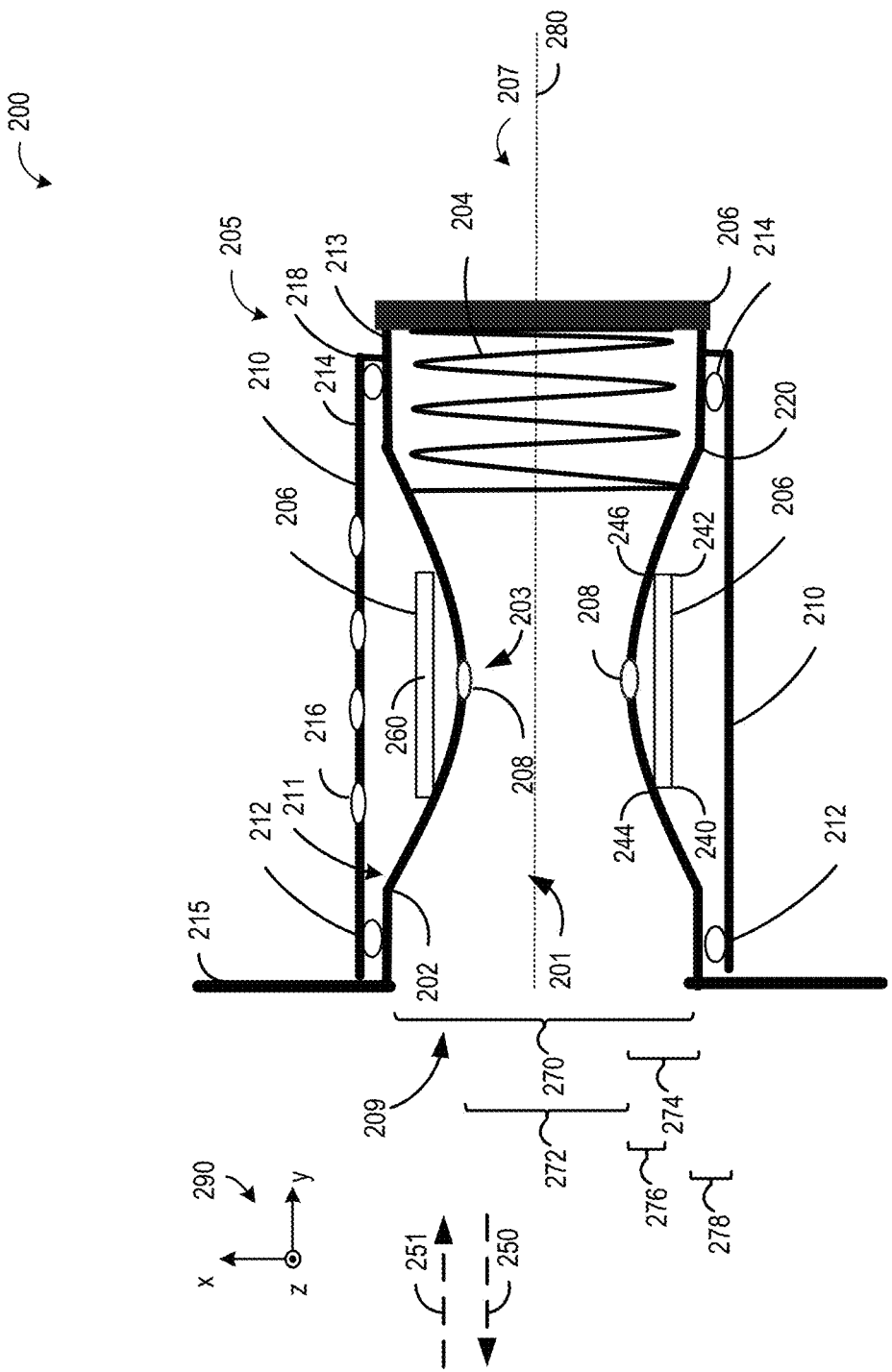
FIG. 2 shows a proposed dual valve of a battery pack with an integrated PRV/PED, in accordance with one or more embodiments of the present disclosure.
Figure 3:
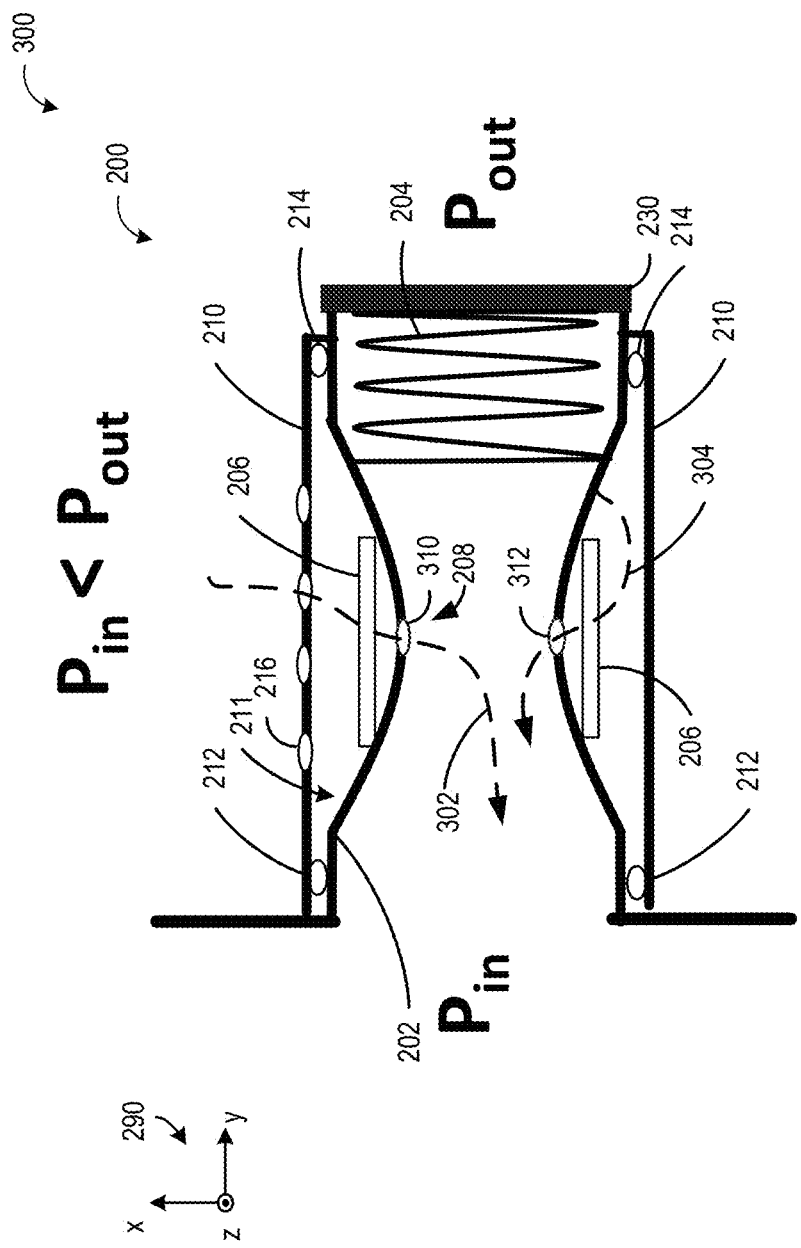
FIG. 3 shows the dual valve in operation in a first condition, when static pressure inside the battery pack is lower than ambient pressure, in accordance with one or more embodiments of the present disclosure.
Figure 4:
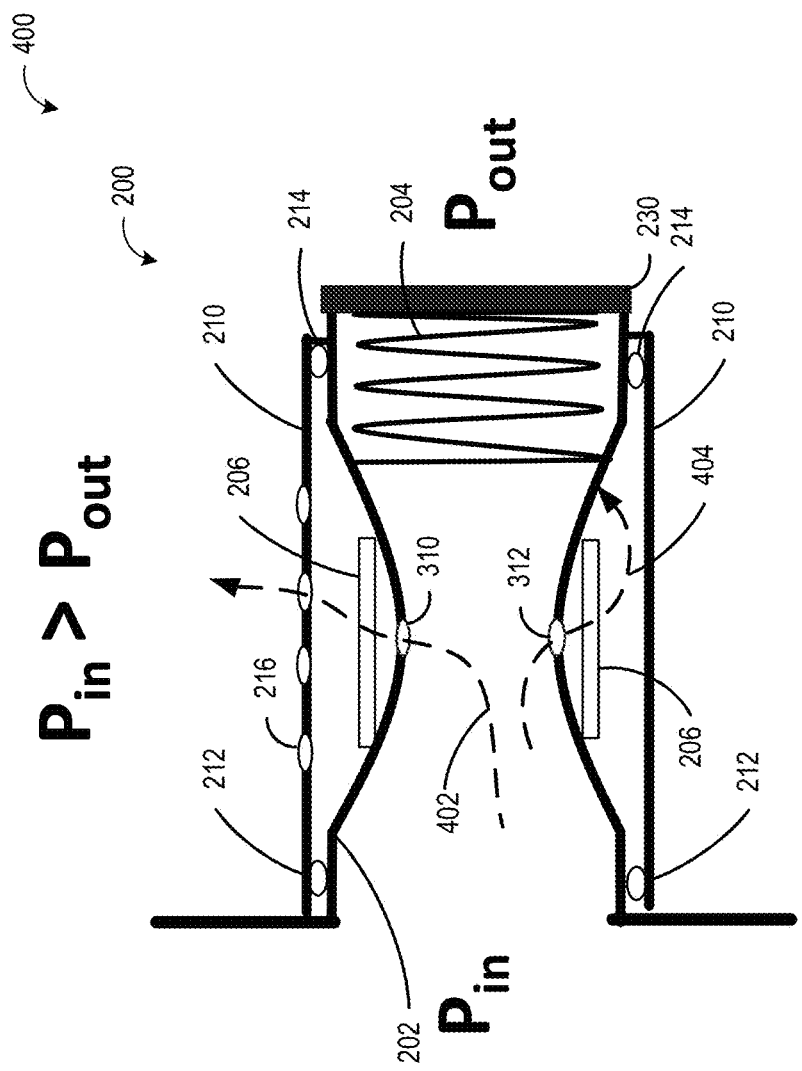
FIG. 4 shows the dual valve in operation in a second condition, when static pressure inside the battery pack is higher than ambient pressure, in accordance with one or more embodiments of the present disclosure.
Figure 5:
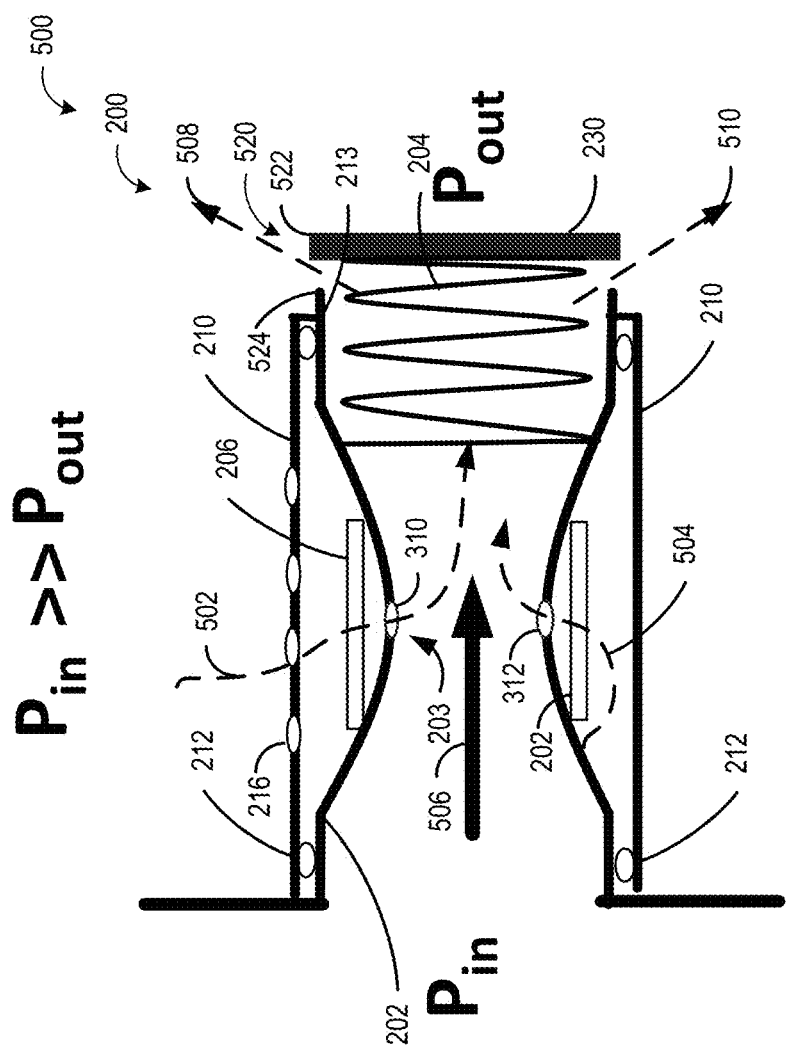
FIG. 5 shows the dual valve in operation in a third, thermal runaway condition, in accordance with one or more embodiments of the present disclosure.
Figure 6:
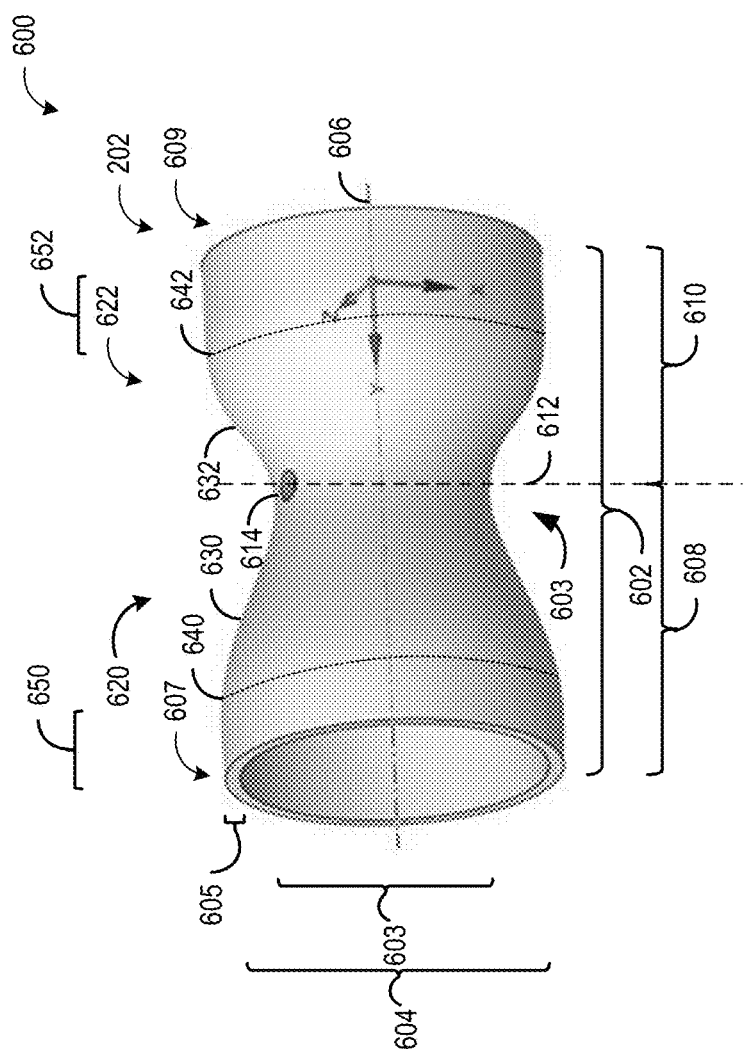
FIG. 6 is a perspective view of a Venturi tube of the dual valve, in accordance with one or more embodiments of the present disclosure.
Figure 7:
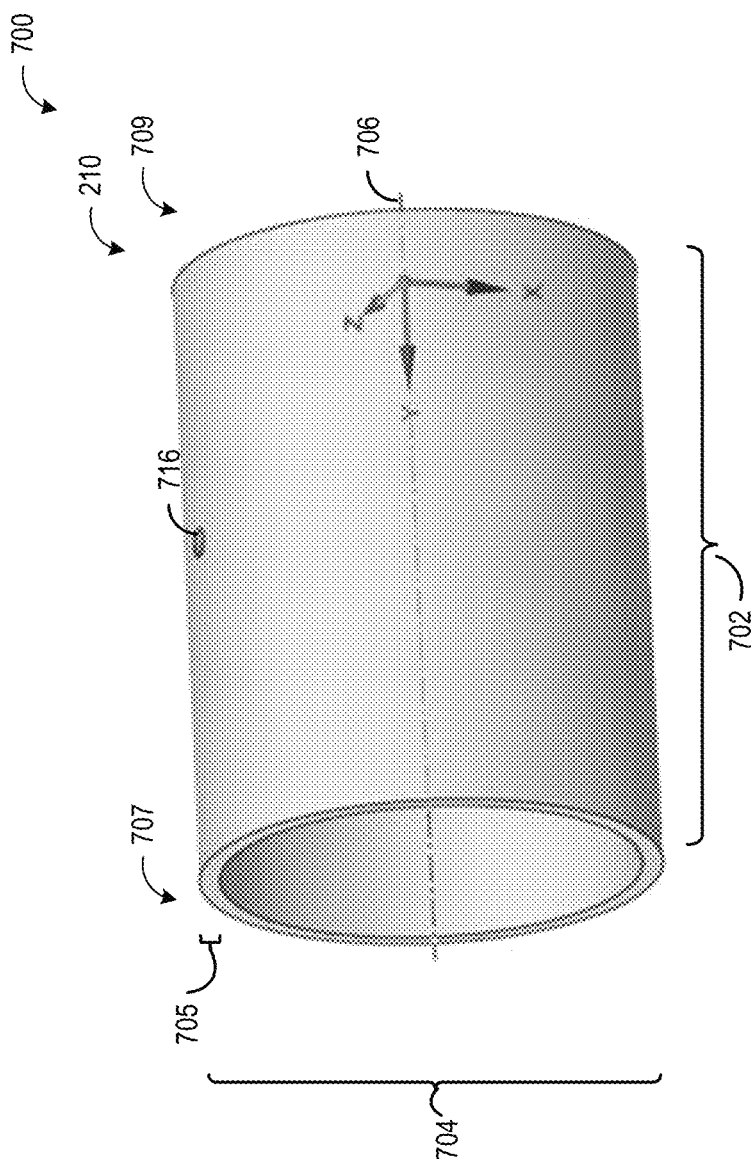
FIG. 7 is a perspective view of membrane protection tube of the dual valve, in accordance with one or more embodiments of the present disclosure.
Figure 8:
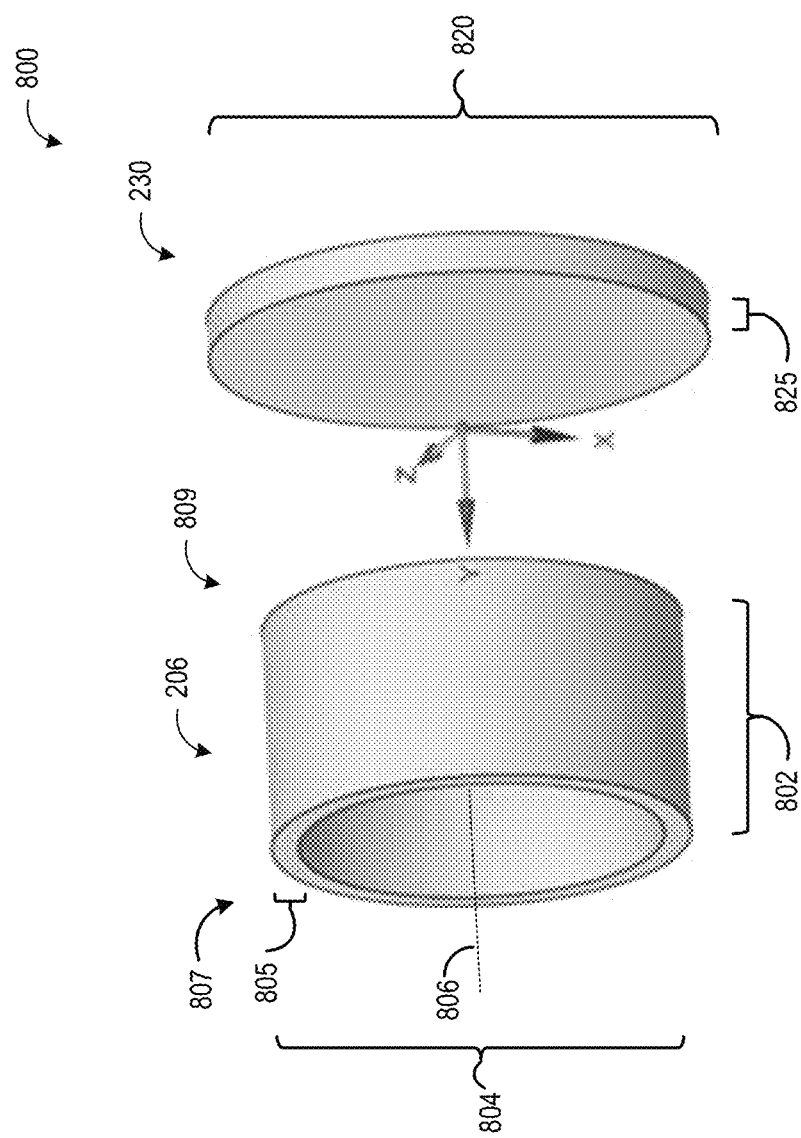
FIG. 8 is a perspective view of an annulus membrane and disc valve of the dual valve, in accordance with one or more embodiments of the present disclosure.
Figure 9:
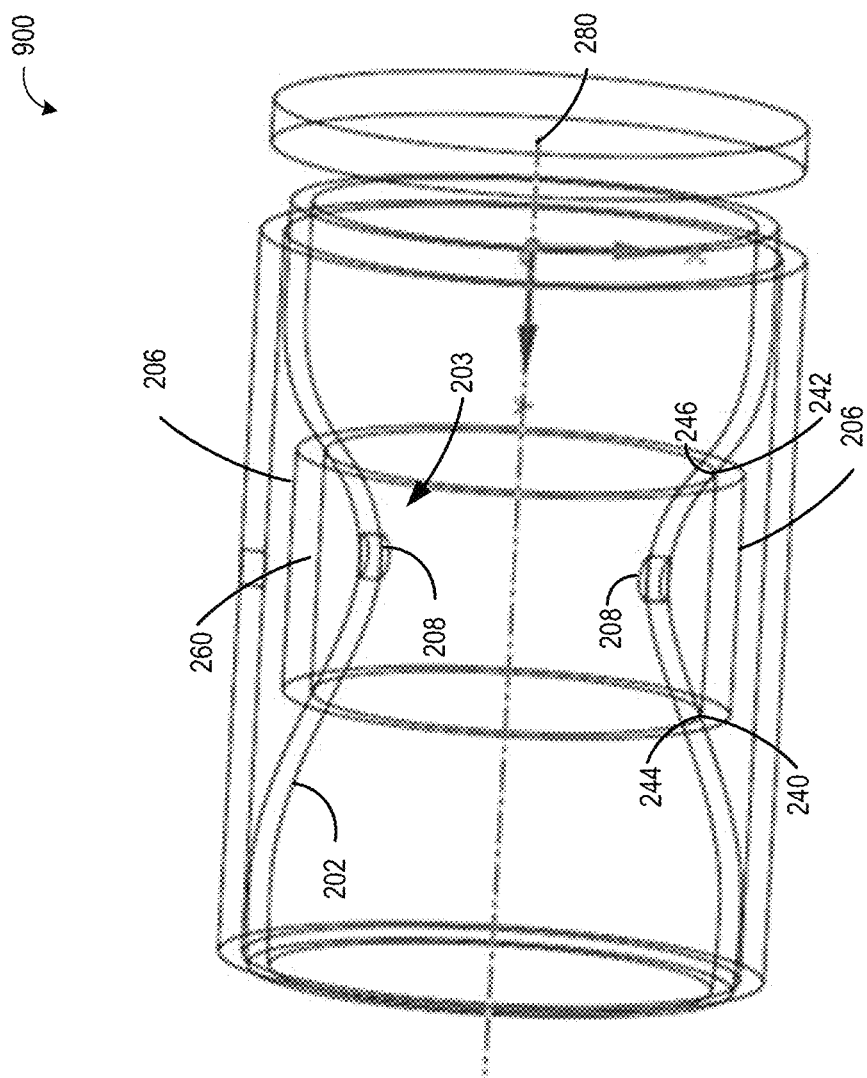
FIG. 9 shows a 3D wire frame diagram of the dual valve, in accordance with one or more embodiments of the present disclosure.
Figure 10:
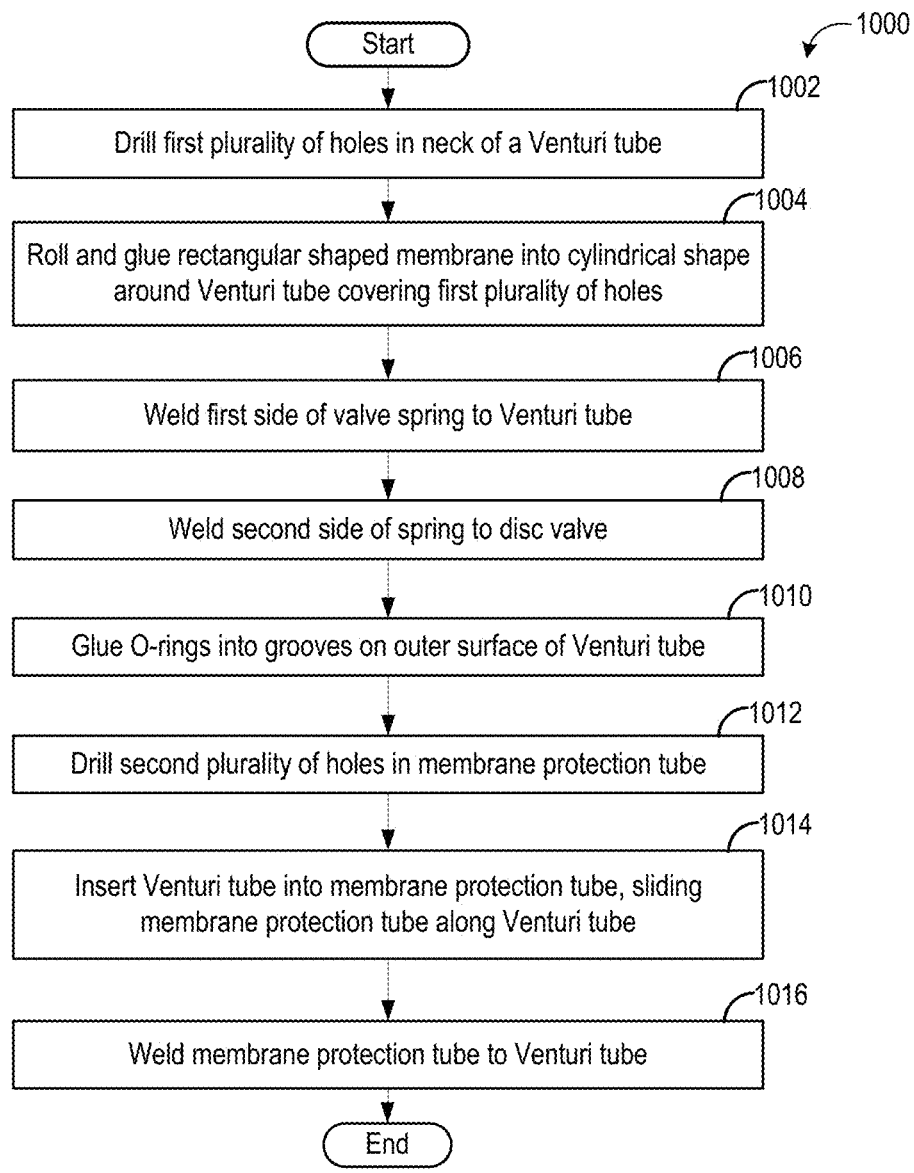
FIG. 10 is a method for assembling the dual valve, in accordance with one or more embodiments of the present disclosure.

A dual pressure relief valve (PRV)/pressure equilibrium device (PED) valve assembly (also referred to herein as a dual valve) for a battery pack of an electric vehicle (EV) is described herein, which may seal and balance pressures inside the battery pack under normal conditions and expel vent-gas under thermal runaway conditions to reduce a temperature inside the battery pack and protect electric components therein. The dual valve disclosed herein may combine the functionalities of a typical PRV and a typical PED into a single assembly with fewer moving parts, which may reduce manufacturing resources of the battery pack and increase a useful life of the PRV/PED valves. A conventional battery pack with a separate PRV and PED is shown in FIG. 1. The proposed dual valve is depicted in FIG. 2. FIGS. 3, 4, and 5 show a flow of air into or out of the dual valve under different conditions, including when pressure inside the valve is lower than ambient pressure (FIG. 3), when pressure inside the valve is higher than ambient pressure (FIG. 4), and under thermal runaway conditions (FIG. 5). Perspective views of a Venturi tube, a membrane protection tube, and a disc valve of the proposed dual valve are shown in FIGS. 6, 7, and 8, respectively. FIG. 9 shows a wire frame diagram of the dual valve. FIG. 10 shows a method for assembling the dual valve.

Turning now to FIG. 1, an external perspective view of a portion of a battery pack 100 of an EV is shown. Battery pack 100 includes a top cover 102 and a bottom cover 104, which may be joined together and sealed at a junction 110 to enclose internal components of battery pack 100. When top cover 102 and bottom cover 104 are sealed at junction 110, an internal pressure inside battery pack 100 may be different from an ambient pressure outside battery pack 100. Under some conditions, such as when a temperature of battery pack 100 is lower than an ambient temperature outside battery pack 100, the internal pressure may be lower than the ambient pressure. Under other conditions, such as when the temperature of battery pack 100 is higher than the ambient temperature (e.g., during operation of the EV), the internal pressure may be higher than the ambient pressure. Thus, a pressure difference between the interior pressure and the ambient pressure may fluctuate over time.

To accommodate the fluctuating pressure difference and balance the internal and ambient pressure, battery pack 100 includes a PRV 106 and a PED 108. PRV 106 may be a spring controlled valve, or a simple ON/OFF valve that releases the internal pressure of the battery pack 100 when the internal pressure exceeds the ambient pressure, and in particular, during the thermal runaway conditions. PED 108 may balance the internal and external pressures to maintain an equilibrium, and prevent moisture from entering battery pack 100, via a membrane 109 that allows air to pass from the interior of battery pack 100 to an environment of battery pack 100. Typically, PED 108 includes a temperature-sensitive spring that adjusts a position of a piston as a function of the internal temperature of battery pack 100. That is, as the internal temperature increases, the spring may expand. When the internal temperature reaches a threshold temperature (e.g., during the thermal runaway conditions), the piston is actuated to a closed position, sealing battery pack 100. Membrane 109 covers the piston, which may protect high-voltage electrical components of the EV surrounding battery pack 100 from heat in vent gas escaping from battery pack 100 during normal operation of battery pack 100. However, during the thermal runaway conditions, membrane 109 may degrade as a result of high temperatures of the vent gas. Thus, by actuating PED 108 to seal battery pack 100 during the thermal runaway conditions, a degradation of membrane 109 may be prevented. However, due to the temperature-sensitive spring and other moving parts, PED 108 may be resource intensive to manufacture, which may increase the resources needed for battery pack 100.

To reduce the resources needed for battery pack 100 and increase a performance of PED 108 and PRV 106 with respect to reducing the temperature and/or pressure inside battery pack 100, a dual PRV/PED valve is proposed that combines functionalities of PRV 106 and PED 108 with new features, as described below in reference to FIG. 2.

Referring now to FIG. 2, a dual PRV/PED 200 of a battery pack of an EV such as battery pack 100 is shown, in accordance with an embodiment, that may combine the functionalities of PRV 106 and PED 108 of FIG. 1. Dual PRV/PED valve 200 (also referred to herein as dual valve 200) includes a Venturi section 201, comprising a Venturi tube 202 with a narrowed middle section or neck 203, coupled to a valve section 205. Venturi tube 202 has an outer diameter 270, and an inner diameter 272 at a neck 203 of Venturi tube 202. Neck 203 may be recessed from outer diameter 270 around a circumference of Venturi tube 202 by a distance 274. In one example, outer diameter 270 is 50 mm and inner diameter 272 is 30 mm.

Venturi tube 202 may include a plurality of inner holes 208 positioned around inner diameter 272 of neck 203 of Venturi tube 202, which may allow air from an ambient environment of the battery pack to enter Venturi tube 202, and air from inside the battery pack to exit Venturi tube 202. The plurality of inner holes 208 may be positioned around inner diameter 272 at fixed distances from each other. In one example, two inner holes 208 are arranged around inner diameter 272 at opposite sides of Venturi tube 202. In other examples, a single inner hole 208, or additional holes 208 may be included in Venturi tube 202. The inner holes 208 may have a diameter of 5 mm, in one example.

The air passing through the inner holes 208 passes through an annulus membrane 206, which may remove moisture and equalize pressure within dual valve 200 as described above in reference to membrane 109 of FIG. 1. Annulus membrane 206 may extend circumferentially around the neck 203 of Venturi tube, such that inner holes 208 are aligned with a midpoint 260 of annulus membrane 206 in a y dimension (e.g., horizontally, in FIG. 2), in accordance with reference axes 290. A first circumferential end 240 of annulus membrane 206 may be coupled to Venturi tube 202 at a first circumference of Venturi tube 202 at a point 244, and second circumferential end 242 of annulus membrane 206 may be coupled to Venturi tube 202 at a second circumference of Venturi tube 202 at a point 246. In one example, annulus membrane 206 may be positioned around the circumference of Venturi tube 202 at a distance 276 halfway between inner diameter 272 and outer diameter 270. In other examples, annulus membrane 206 may be positioned closer or farther from inner holes 208. In various examples, annulus membrane 206 may be glued to Venturi tube 202.

Referring briefly to FIG. 9, a 3D wire frame diagram 900 of Venturi tube 202 is shown, where a positioning of annulus membrane 206 with respect to Venturi tube 202 is more clearly illustrated. In particular, face-sharing contact is shown between first circumferential end 240 of annulus membrane 206 and the first circumference of Venturi tube 202 at point 244, and second circumferential end 242 of annulus membrane 206 and the second circumference of Venturi tube 202 at point 246.

Returning to FIG. 2, annulus membrane 206 may be protected by a membrane protection tube 210, which may be positioned circumferentially around Venturi tube 202, and coaxially aligned around a central axis 280 of Venturi tube 202. Membrane protection tube 210 may be welded to a valve body portion 213 of Venturi tube 202 at an external circumferential edge 218 of membrane protection tube 210. In some examples, membrane protection tube 210 may be positioned at a distance 278 from Venturi tube 202, creating a space 211 between an inner diameter of membrane protection tube 210 and outer diameter 270 of Venturi tube 202. Space 211 may be sealed at an interior end 209 of dual valve 200 by a first O ring 212, and space 211 may be sealed at an exterior end 207 of dual valve 200 by a second O ring 214. Both Venturi tube 202 and membrane protection tube 210 may be welded to a surface 215 of the battery pack at interior end 209 of dual valve 200.

Membrane protection tube 210 includes a plurality of outer holes 216, which may allow air to pass from an external environment of dual valve 200 into space 211, and from space 211 to the external environment. The plurality of outer holes 216 may be positioned circumferentially around annulus membrane 206. The outer holes 216 may have a diameter of 2 mm, in one example. The plurality of outer holes 216 may be positioned at regular fixed distances from each other, in the y dimension shown in reference axes 290. Additionally or alternatively, the plurality of outer holes 216 may be positioned at regular fixed distances from each other circumferentially around a surface of membrane protection tube 210. In some examples, the plurality of outer holes 216 may be greater than the plurality of inner holes 208.

Valve section 205 includes a valve spring 204 that is coupled to a disc valve 230 at an exterior end 207 of dual valve 200. Valve spring 204 may not be a temperature-sensitive spring, as described above in reference to PED valve 108 of FIG. 1. As a result, resources needed for valve spring 204 may be less than resources needed for the temperature-sensitive spring of PED valve 108. Valve spring 204 may be coupled to Venturi tube 202 near an edge 220 of valve body portion 213 of Venturi tube 202, where a circumference of Venturi tube 202 is equal to a circumference of valve spring 204. Dual valve 200 may be a normally closed valve, where dual valve 200 is closed as a result of a pressure of disc valve 230 against valve section 205 (e.g., in a first direction 250). Dual valve 200 may be open (e.g., to the battery pack) at the interior end 209 of dual valve 200.

When pressure increases inside the battery pack, pressurized air may flow in a second direction 251 through Venturi section 201, which may cause valve spring 204 to extend, opening disc valve 230 and allowing the pressurized air to flow out of dual valve 200 around a circumferential edge of disc valve 230, as shown in more detail in FIG. 5.

Thus, Venturi section 201 may function as a PED of dual valve 200, where air may enter and exit the battery pack through annulus membrane 206 during normal operation of the EV. Valve section 205 may function as a PRV of dual valve 200, where during thermal runaway conditions, air may exit the battery pack via disc valve 230, thereby protecting annulus membrane 206 from degradation caused by pressurized hot air.

FIGS. 3, 4, and 5 show dual valve 200 under different pressure and temperature conditions. Turning to FIG. 3, a first air flow diagram 300 shows a flow of air through dual valve 200 in a first condition, when static pressure inside the battery pack is lower than ambient pressure outside the battery pack. In FIG. 3, disc valve 230 is closed. When the static pressure inside the battery pack is lower, pressurized air enters Venturi tube 202 via the plurality of outer holes 216, as indicated by a dashed arrow 302. The air passes through annulus membrane 206, and enters Venturi tube 202 via the plurality of inner holes 208. Air passes from Venturi tube 202 into the battery pack, to equalize the static pressure inside the battery pack and the ambient pressure outside the battery pack. In the depicted embodiment, the plurality of inner holes 208 include a first inner hole 310 positioned at a top side of Venturi tube 202 (e.g., in the x dimension according to reference axes 290), and a second inner hole 312 positioned at a bottom side of Venturi tube 202, while the plurality of outer holes 216 are distributed longitudinally along a top side of membrane protection tube 210, meaning, horizontally in the y dimension and not circumferentially around membrane protection tube 210. As such, the air entering inner holes 310 and 312 may circulate around Venturi tube 202 within space 211, permeating annulus membrane 206 at various locations before finally entering inner hole 312, as indicated by a dashed arrow 304.

In FIG. 4, a second air flow diagram 400 shows a flow of air through dual valve 200 in a second condition, when the static pressure inside the battery pack is higher than the ambient pressure, but below a threshold pressure, where pressures above the threshold pressure may be indicative of a thermal runaway condition. For example, the threshold pressure may be five kilopascals (kPa). In FIG. 4, disc valve 230 is closed. When the static pressure inside the battery pack is higher than the ambient pressure, pressurized air exits Venturi tube 202 via inner holes 310 and 312, as indicated by a dashed arrow 402. The air passes through annulus membrane 206, and exits membrane protection tube 210 via the plurality of outer holes 216, to equalize the static pressure inside the battery pack and the ambient pressure outside the battery pack. As described above, because the plurality of outer holes 216 and the plurality of inner holes 208 may not be circumferentially aligned, the air exiting inner holes 310 and 312 may circulate around Venturi tube 202 within space 211, permeating annulus membrane 206 at various locations, before finally exiting outer holes 216, as indicated by a dashed arrow 404.

FIG. 5 shows a third air flow diagram 500 that indicates a flow of air through dual valve 200 in a third, thermal runaway condition, when the static pressure inside the battery pack is higher than the ambient pressure and above the threshold pressure. Under the thermal runaway condition, the pressure of the air inside the battery pack may not be sufficiently lowered by the exiting of the air via inner holes 310 and 312, annulus membrane 206, and the plurality of outer holes 216 as described in reference to FIG. 4. Additionally, annulus membrane 206 may be degraded by exiting pressurized air. However, in the thermal runaway condition, pressurized air may cause valve spring 204 to expand, thereby generating a flow of vent gas towards disc valve 230 in a direction indicated by an arrow 506. Valve spring 204 may have a pre-load corresponding to the threshold pressure. When the threshold pressure is achieved, disc valve 230 may be actuated open, and the vent gas may flow out of dual valve 200 at a gap 520 between a circumferential edge 522 of disc valve 230 and an exterior circumferential edge 524 of valve body portion 213, as indicated by dashed arrows 508 and 510.

Additionally, an advantage of Venturi tube 202 is that a curved shape of Venturi tube 202 may cause the flow of vent gas entering Venturi tube 202 from the interior of the battery pack to slow down as the vent gas approaches neck 203, and speed up as the vent gas passes neck 203, until exiting Venturi tube 202 via gap 520. As a result of the increase in speed of the vent gas after passing neck 203, the static pressure at the neck 203 may be lower than the ambient pressure, which may cause external air from an environment outside dual valve 200 to be drawn into Venturi tube 202 via the plurality of outer holes 216, permeating annulus membrane 206, and entering Venturi tube 202 via inner holes 310 and 312, as indicated by a dashed arrow 502 and a dashed arrow 504. The external air may join with the flow of vent gas indicated by arrow 506, and exit via gap 520 along with the vent gas. Because the external air is colder than the vent gas, drawing the external air into Venturi tube 202 in this manner may advantageously decrease a temperature of the vent gas prior to being expelled into the external environment. The vent gas may be combustible, where if the temperature of the vent gas exceeds a threshold temperature (for example, 650° C.), the vent gas may be ignited when mixed with ambient air and sufficient oxygen. A reduction of temperature before the vent gas is expelled into ambient may help to prevent this from happening.

FIG. 6 shows a perspective view 600 of Venturi tube 202 of dual valve 200. Venturi tube 202 has a length 602, a diameter 604 (e.g., inner diameter 272 of FIG. 2), and a thickness 605. In one example, length 602 is 65 mm, diameter 604 is 50 mm, and thickness 605 is 1.5 mm. Venturi tube 202 has a cylindrical shape coaxially aligned around a central axis 606 (e.g., central axis 280) and extending from a first end 607 to a second end 609, with a neck 603 where Venturi tube 202 narrows to a minimum diameter 603 (e.g., inner diameter 272) at a dashed line 612. An inner hole 614 (e.g., inner hole 310) is depicted as centered on dashed line 612. Thus, Venturi tube 202 is divided into two portions: a first portion 620 with a length 608, and a second portion 622 with a length 610. Length 608 may be the same as length 610, or length 608 may be different from length 610.

Additionally, first portion 620 includes a first curved circumferential surface 630 that slopes from a first circumferential line 640 of Venturi tube 202 proximate a first end 607 of Venturi tube 202 to dashed line 612, and second portion 622 includes a second curved circumferential surface 632 that slopes from dashed line 612 to a second circumferential line 642 of Venturi tube 202 proximate a second end 609 of Venturi tube 202. A first distance 650 between first circumferential line 640 and first end 607 may be equal to a second distance 652 between second circumferential line 642 and second end 609, or the first distance 650 may be different from second distance 652.

A first curve or slope of first curved circumferential surface 630 may be equal to a second curve or slope of the second curved circumferential surface 632, or the first curve or slope of first curved circumferential surface 630 may be different from a second curve or slope of the second curved circumferential surface 632. In one example, second curved circumferential surface 632 has a different slope than first curved circumferential surface 630, where the different slope may maximize an increase in speed of vent gas through Venturi tube 202 during thermal runaway conditions to increase an amount of cool air drawn into Venturi tube 202 via inner hole 614.

FIG. 7 shows a perspective view 700 of membrane protection tube 210 of dual valve 200. Membrane protection tube 210 has a cylindrical shape coaxially aligned around a central axis 706, which may be the same as central axis 606 and central axis 280 of FIG. 2, and extending from a first end 707 to a second end 709. An outer hole 716 (e.g., outer holes 216) is depicted as centered on membrane protection tube 210 between first end 707 and second end 709.

Membrane protection tube 210 has a length 702, a diameter 704, and a thickness 705. Length 702 may be greater than length 602 of Venturi tube 202, such that Venturi tube 202 may be completely enclosed within membrane protection tube 210. That is, membrane protection tube 210 may be positioned around Venturi tube 202 with first end 607 of Venturi tube 202 aligned with a first end 707, where both of first end 607 and first end 707 are coupled to a surface of a battery pack, as shown in FIG. 1. When first end 607 is aligned with first end 707, no portion of Venturi tube 202 may extend out of a second end 709 of membrane protection tube 210. Length 702 may be approximately equal to length 602 of Venturi tube 202.

Diameter 704 may be slightly greater than diameter 604 of Venturi tube 202, to allow Venturi tube 202 to be inserted inside membrane protection tube 210. A difference in diameter 704 and diameter 604 may be equal to a diameter of O ring 214, such that the space 211 between an inner surface of membrane protection tube 210 and an outer surface of Venturi tube 202 is sealed by O ring 214 at second end 709. Thickness 705 may be equal to thickness 605 of Venturi tube 202, or thickness 705 may be different from thickness 605.

In one example, length 702 is 70 mm, diameter 704 is 55 mm, and thickness 705 is 1.0 mm.

FIG. 8 shows a perspective view 800 of annulus membrane 206 and disc valve 230 of dual valve 200. As described above in reference to FIG. 2, annulus membrane 206 has a cylindrical shape coaxially aligned around a central axis 806, which may be the same as central axis 606, central axis 706, and central axis 280, extending from a first end 807 to a second end 809. Annulus membrane 206 has a length 802, a diameter 804, and a thickness 805. Length 802 and diameter 804 may depend on a positioning of annulus membrane 206 with respect to Venturi tube 202, as described above. Thickness 805 may depend on a type of membrane used.

Disc valve 230 has a diameter 820 and a thickness 825. Diameter 820 may be equal to or greater than diameter 270 of Venturi tube 202, such that when dual valve 200 is in a closed position (e.g., by valve spring 204), disc valve 230 covers second end 609 (e.g., exterior end 207) of Venturi tube 202, such that air cannot escape between second end 609 of Venturi tube 202 and disc valve 230. Thickness 825 may be greater than either or both of thicknesses 705 and/or 605, to withstand a pressure difference between an interior and an exterior of dual valve 200.

Referring now to FIG. 10, an exemplary method 1000 is shown for manufacturing dual valve 200. At 1002, method 1000 includes drilling a plurality of holes (e.g., inner holes 208) in a neck of a Venturi tube. The holes may be arranged around a narrowest portion of the Venturi tube, at a middle of the Venturi tube. The plurality of holes may include two holes, or more holes, spaced equidistantly from each other.

At 1004, method 1000 includes forming and gluing a rectangular shaped membrane into a cylindrical shape around the Venturi tube, such that the membrane covers the plurality of holes in the Venturi tube. The membrane may have a microporous structure that delivers a high flow rate of air through the membrane, a high number of sterilization cycles, and a long life, and may perform separation, purification, and sterilization functions in a variety of air and liquid ultra-high purity gas microfiltration systems. When the membrane is glued to the Venturi tube, the membrane forms an annulus that seals an interior of the Venturi tube, such that air entering or exiting the Venturi tube via the holes in the middle of the Venturi tube passes through the membrane. The membrane may prevent moisture from an external environment of the dual valve from entering the dual valve.

At 1006, method 1000 includes welding a first side of a valve spring (e.g., valve spring 204) to a first side of the Venturi tube.

At 1008, method 1000 includes welding a disc valve (e.g., disc valve 230) to a second, opposite side of the valve spring. The valve spring may be configured to have a pre-load threshold that seals the disc valve against the first side of the Venturi tube when the pre-load threshold is not achieved. When the pre-load threshold is achieved, for example, due to a pressure of vent gas inside the dual valve during thermal runaway conditions, the valve spring may extend, releasing the pressure of the disc valve against the Venturi tube and opening the disc valve.

At 1010, method 1000 includes gluing a first O ring into a first groove of an outer surface of the first end of the Venturi tube, and gluing a second O ring into a second groove of an outer surface of a second, opposite end of the Venturi tube (e.g., O rings 212 and 214).

At 1012, method 1000 includes drilling a second plurality of holes in a membrane protection tube (e.g., outer holes 216 of membrane protection tube 210).

At 1014, method 1010 includes inserting the Venturi tube into the membrane protection tube. As described above in reference to FIGS. 6-8, diameters of the Venturi tube and the membrane protection tube may be configured such that the Venturi tube may be slid into the membrane protection tube, starting with a second, opposite end of the Venturi tube, with the first and second O rings sealing a space (e.g., space 211) between and outer surface of the Venturi tube and an inner surface of the membrane protection tube. When the Venturi tube is fully inserted into the membrane protection tube, a second, a first end of the membrane protection tube may be approximately aligned with the disc valve, and a second end of the membrane protection tube opposite the disc valve may be aligned with the second, opposite end of the Venturi tube.

At 1016, method 1010 includes welding the membrane protection tube to the Venturi tube. The membrane protection tube may be welded to a valve body portion (e.g., valve body portion 213) of the Venturi tube at the first end of the Venturi tube proximate to the disc valve, at a location outside of the second O ring, such that an interior of the dual valve is sealed from the weld by the second O ring. In some examples, the membrane protection tube may also be welded to the second end of the Venturi tube (e.g., opposite the disc valve), at a location outside of the first O ring, such that the interior of the dual valve is sealed from the weld by the first O ring. In other embodiments, the membrane protection tube may be welded to a surface of an enclosure, such as an enclosure of a battery pack of an EV, at a the second end of the membrane protection tube opposite the disc valve, at a location outside of the first O ring, such that the interior of the dual valve is sealed from the weld by the first O ring.

In this way, a dual PRV/PED assembly for an enclosure, such as a battery pack, provides a more efficient and less expensive alternative to separate, conventional PRV and PED devices. By combining the PRV and the PED into a single device, a number of parts may be reduced, thereby reducing manufacturing resources of the PRV and PED devices. In particular, a conventional PED relies on a piston and a more resource intensive temperature-sensitive spring to protect a membrane of the PED in thermal runaway conditions, which are replaced in the disclosed dual PRV/PED assembly by a simpler and less expensive spring-mounted disc valve that may be less prone to degradation. By positioning the disc valve at an end of a Venturi tube through which vent gas is expelled, and wrapping the membrane around the Venturi tube, the pressurized, hot air of the vent gas is redirected away from the membrane as the disc valve opens. In contrast, the membrane of the conventional PED device is sealed by the piston as the temperature-sensitive spring expands. If the temperature-sensitive spring degrades and does not expand sufficiently under the thermal runaway conditions, or a valve seal of the piston degrades, the seal created by the piston may leak, causing a degradation of the membrane. Thus, the dual PRV/PED presents a more robust apparatus for protecting the membrane while allowing pressure between the enclosure and the environment to equalize. Further, an additional advantage of the dual PRV/PED is that due to a shape of the Venturi tube, vent gas expelled via the disc valve increases in speed as it passes a neck of the Venturi tube, which may draw cool air into the vent gas via the membrane. The cool air may decrease a temperature of the vent gas as it is expelled, which may reduce an impingement of the hot vent gas on elements of the environment. Thus, in comparison with the conventional PRV and PED devices, the dual PRV/PED may provide a more robust and efficient solution to managing pressure and temperature differences inside and outside a sealed enclosure. The technical effect of combining a PED designed a membrane surrounding a Venturi tube with a PRV valve is that vent gas may be more efficiently released from an enclosure, in a way that reduces a potential for degradation of the membrane while cooling the vent gas upon release.

The disclosure also provides support for a pressure relief valve (PRV)/pressure equilibrium device (PED) assembly, comprising a valve section and a Venturi section, the Venturi section including: a Venturi tube having a first plurality of inner holes arranged at a middle, neck portion of the Venturi tube, an annulus membrane coupled to the Venturi tube, the annulus membrane positioned circumferentially around the middle, neck portion, and a membrane protection tube positioned circumferentially around the annulus membrane, the membrane protection tube having a second plurality of outer holes. In a first example of the system, the annulus membrane and the membrane protection tube are coaxially aligned with a central axis of the Venturi tube. In a second example of the system, optionally including the first example, a first circumferential end of the annulus membrane is glued to the Venturi tube at a first circumference of the Venturi tube, and a second circumferential end of the annulus membrane is glued to the Venturi tube at a second circumference of the Venturi tube. In a third example of the system, optionally including one or both of the first and second examples, the annulus membrane is circumferentially positioned around the Venturi tube at a distance from the central axis that is halfway between an inner diameter and an outer diameter of the Venturi tube. In a fourth example of the system, optionally including one or more or each of the first through third examples, a midpoint of the annulus membrane is aligned with the first plurality of inner holes. In a fifth example of the system, optionally including one or more or each of the first through fourth examples, the second plurality of outer holes is greater than the first plurality of inner holes. In a sixth example of the system, optionally including one or more or each of the first through fifth examples, the valve section includes a disc valve coupled to a valve spring housed within a valve body portion of the Venturi tube such that the disc valve is normally closed via a pressure of the disc valve against the valve body portion. In a seventh example of the system, optionally including one or more or each of the first through sixth examples, the PRV/PED assembly is coupled to an enclosure of a battery pack of an EV. In a eighth example of the system, optionally including one or more or each of the first through seventh examples, a first end of the membrane protection tube is coupled to the enclosure, and a second, opposite end of the membrane protection tube is coupled to the valve body portion of the Venturi tube. In a ninth example of the system, optionally including one or more or each of the first through eighth examples, the Venturi tube includes a first curved circumferential surface that slopes from a first end of the Venturi tube to a narrowest diameter of the Venturi tube, and a second curved circumferential surface that slopes from the narrowest diameter of the Venturi tube to a second end of the Venturi tube, the second curved circumferential surface having a different slope than the first curved circumferential surface.

The disclosure also provides support for a method for operating a pressure relief valve (PRV)/pressure equilibrium device (PED) of a battery pack, the PRV/PED having a valve section and a Venturi section, the Venturi section including a Venturi tube having a first plurality of inner holes arranged at a middle, neck portion of the Venturi tube, an annulus membrane coupled to the Venturi tube, the annulus membrane positioned circumferentially around the middle, neck portion, and a membrane protection tube positioned circumferentially around the annulus membrane, the membrane protection tube having a second plurality of outer holes, the method comprising: operating in a first condition, where an internal pressure inside the battery pack is less than an ambient pressure outside the battery pack, including receiving air from an external environment into the battery pack through the second plurality of outer holes, the annulus membrane, and the first plurality of inner holes, operating in a second condition where the internal pressure inside the battery pack is greater than the ambient pressure outside the battery pack but less than a threshold pressure, including expelling air from the battery pack to the external environment through the first plurality of inner holes, the annulus membrane, and the second plurality of outer holes, and operating in a third condition where the internal pressure inside the battery pack is greater than the ambient pressure outside the battery pack and greater than the threshold pressure, including expelling vent gas from the battery pack to the external environment via a disc valve of the valve section. In a first example of the method, the disc valve is maintained closed during the first and second conditions due to a pressure exerted on a valve body portion of the Venturi tube at the valve section by a valve spring that couples the disc valve to the Venturi tube, and the disc valve is opened as a result of the valve spring extending due to a pressure of the vent gas. In a second example of the method, optionally including the first example, the method further comprises: during the operation in the third condition, cooling the vent gas by mixing air from the external environment into the vent gas, the air drawn into the Venturi tube via the annulus membrane by an increase in speed of the vent gas past the middle neck portion. In a third example of the method, optionally including one or both of the first and second examples, the Venturi tube includes a first curved circumferential surface that slopes from a first end of the Venturi tube to a narrowest diameter of the Venturi tube, and a second curved circumferential surface that slopes from the narrowest diameter of the Venturi tube to a second end of the Venturi tube, the second curved circumferential surface having a different slope than the first curved circumferential surface. In a fourth example of the method, optionally including one or more or each of the first through third examples, the annulus membrane and the membrane protection tube are coaxially aligned with a central axis of the Venturi tube. In a fifth example of the method, optionally including one or more or each of the first through fourth examples, the annulus membrane is circumferentially positioned around the Venturi tube at a distance from the central axis that is halfway between an inner diameter and an outer diameter of the Venturi tube. In a sixth example of the method, optionally including one or more or each of the first through fifth examples, a first circumferential end of the annulus membrane is glued to the Venturi tube at a first circumference of the Venturi tube, and a second circumferential end of the annulus membrane is glued to the Venturi tube at a second circumference of the Venturi tube. In a seventh example of the method, optionally including one or more or each of the first through sixth examples, a midpoint of the annulus membrane is aligned with the first plurality of inner holes.

The disclosure also provides support for a method for manufacturing a pressure relief valve (PRV)/pressure equilibrium device (PED) assembly, the method comprising: drilling a first plurality of holes at a middle, neck portion of a Venturi tube, forming and gluing a rectangular shaped membrane into a cylindrical shape around the Venturi tube and covering the first plurality of holes, welding a first side of a valve spring to a first side of the Venturi tube, welding a second side of the valve spring to a disc valve, gluing a first O ring into a first groove of an outer surface of the first side of the Venturi tube and a second O ring into a second groove of an outer surface of a second, opposite side of the Venturi tube, drilling a second plurality of holes in a membrane protection tube, inserting the Venturi tube into the membrane protection tube, and welding the membrane protection tube to the Venturi tube. In a first example of the method, the membrane is circumferentially positioned around the Venturi tube at a distance from a central axis of the Venturi tube that is halfway between an inner diameter and an outer diameter of the Venturi tube, such that a midpoint of the cylindrically-shaped membrane is aligned with the first plurality of holes.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

In another representation, a hybrid vehicle includes a battery pack having a pressure relief valve (PRV)/pressure equilibrium device (PED) assembly, the PRV/PED assembly comprising a valve section and a Venturi section, the Venturi section including a Venturi tube having a first plurality of inner holes arranged at a middle, neck portion of the Venturi tube; an annulus membrane coupled to the Venturi tube, the annulus membrane positioned circumferentially around the middle, neck portion; and a membrane protection tube positioned circumferentially around the annulus membrane, the membrane protection tube having a second plurality of outer holes.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A pressure relief valve (PRV)/pressure equilibrium device (PED) assembly, comprising a valve section and a Venturi section, the Venturi section including:
   a Venturi tube having a first plurality of inner holes arranged at a middle, neck portion of the Venturi tube;
   an annulus membrane coupled to the Venturi tube, the annulus membrane positioned circumferentially around the middle, neck portion; and
   a membrane protection tube positioned circumferentially around the annulus membrane, the membrane protection tube having a second plurality of outer holes.

2. The PRV/PED assembly of claim 1, wherein
   the annulus membrane and the membrane protection tube are coaxially aligned with a central axis of the Venturi tube.

3. The PRV/PED assembly of claim 2, wherein a first circumferential end of the annulus membrane is glued to the Venturi tube at a first circumference of the Venturi tube, and a second circumferential end of the annulus membrane is glued to the Venturi tube at a second circumference of the Venturi tube.

4. The PRV/PED assembly of claim 2, wherein the annulus membrane is circumferentially positioned around the Venturi tube at a distance from the central axis that is halfway between an inner diameter and an outer diameter of the Venturi tube.

5. The PRV/PED assembly of claim 2, wherein a midpoint of the annulus membrane is aligned with the first plurality of inner holes.

6. The PRV/PED assembly of claim 1, wherein the second plurality of outer holes is greater than the first plurality of inner holes.

7. The PRV/PED assembly of claim 1, wherein the valve section includes a disc valve coupled to a valve spring housed within a valve body portion of the Venturi tube such that the disc valve is normally closed via a pressure of the disc valve against the valve body portion.

8. The PRV/PED assembly of claim 7, wherein the PRV/PED assembly is coupled to an enclosure of a battery pack of an EV.

9. The PRV/PED assembly of claim 8, wherein a first end of the membrane protection tube is coupled to the enclosure, and a second, opposite end of the membrane protection tube is coupled to the valve body portion of the Venturi tube.

10. The PRV/PED assembly of claim 1, wherein the Venturi tube includes a first curved circumferential surface that slopes from a first end of the Venturi tube to a narrowest diameter of the Venturi tube, and a second curved circumferential surface that slopes from the narrowest diameter of the Venturi tube to a second end of the Venturi tube, the second curved circumferential surface having a different slope than the first curved circumferential surface.

11. A method for operating a pressure relief valve (PRV)/pressure equilibrium device (PED) of a battery pack, the PRV/PED having a valve section and a Venturi section, the Venturi section including a Venturi tube having a first plurality of inner holes arranged at a middle, neck portion of the Venturi tube, an annulus membrane coupled to the Venturi tube, the annulus membrane positioned circumferentially around the middle, neck portion; and a membrane protection tube positioned circumferentially around the annulus membrane, the membrane protection tube having a second plurality of outer holes, the method comprising:
   operating in a first condition, where an internal pressure inside the battery pack is less than an ambient pressure outside the battery pack, including receiving air from an external environment into the battery pack through the second plurality of outer holes, the annulus membrane, and the first plurality of inner holes;
   operating in a second condition where the internal pressure inside the battery pack is greater than the ambient pressure outside the battery pack but less than a threshold pressure, including expelling air from the battery pack to the external environment through the first plurality of inner holes, the annulus membrane, and the second plurality of outer holes; and
   operating in a third condition where the internal pressure inside the battery pack is greater than the ambient pressure outside the battery pack and greater than the threshold pressure, including expelling vent gas from the battery pack to the external environment via a disc valve of the valve section.

12. The method of claim 11, wherein the disc valve is maintained closed during the first and second conditions due to a pressure exerted on a valve body portion of the Venturi tube at the valve section by a valve spring that couples the disc valve to the Venturi tube, and the disc valve is opened as a result of the valve spring extending due to a pressure of the vent gas.

13. The method of claim 11, further comprising:
   during the operation in the third condition, cooling the vent gas by mixing air from the external environment into the vent gas, the air drawn into the Venturi tube via the annulus membrane by an increase in speed of the vent gas past the middle, neck portion.

14. The method of claim 11, wherein the Venturi tube includes a first curved circumferential surface that slopes from a first end of the Venturi tube to a narrowest diameter of the Venturi tube, and a second curved circumferential surface that slopes from the narrowest diameter of the Venturi tube to a second end of the Venturi tube, the second curved circumferential surface having a different slope than the first curved circumferential surface.

15. The method of claim 11, wherein the annulus membrane and the membrane protection tube are coaxially aligned with a central axis of the Venturi tube.

16. The method of claim 15, wherein the annulus membrane is circumferentially positioned around the Venturi tube at a distance from the central axis that is halfway between an inner diameter and an outer diameter of the Venturi tube.

17. The method of claim 11, wherein a first circumferential end of the annulus membrane is glued to the Venturi tube at a first circumference of the Venturi tube, and a second circumferential end of the annulus membrane is glued to the Venturi tube at a second circumference of the Venturi tube.

18. The method of claim 11, wherein a midpoint of the annulus membrane is aligned with the first plurality of inner holes.

19. A method for manufacturing a pressure relief valve (PRV)/pressure equilibrium device (PED) assembly, the method comprising:
   drilling a first plurality of holes at a middle, neck portion of a Venturi tube;
   forming and gluing a rectangular shaped membrane into a cylindrical shape around the Venturi tube and covering the first plurality of holes;
   welding a first side of a valve spring to a first side of the Venturi tube;

welding a second side of the valve spring to a disc valve;
gluing a first O ring into a first groove of an outer surface of the first side of the Venturi tube and a second O ring into a second groove of an outer surface of a second, opposite side of the Venturi tube;
drilling a second plurality of holes in a membrane protection tube;
inserting the Venturi tube into the membrane protection tube; and
welding the membrane protection tube to the Venturi tube.

20. The method of claim 19, wherein the membrane is circumferentially positioned around the Venturi tube at a distance from a central axis of the Venturi tube that is halfway between an inner diameter and an outer diameter of the Venturi tube, such that a midpoint of the cylindrically-shaped membrane is aligned with the first plurality of holes.

\* \* \* \* \*